United States Patent
Liu

(10) Patent No.: US 8,055,280 B2
(45) Date of Patent: Nov. 8, 2011

(54) METHOD FOR DUAL-MODE ACCESS TERMINAL TO RESPOND TO 1X PAGING IN HRPD NETWORK

(75) Inventor: Weimin Liu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 1154 days.

(21) Appl. No.: 11/521,601

(22) Filed: Sep. 15, 2006

(65) Prior Publication Data

US 2007/0072627 A1 Mar. 29, 2007

(30) Foreign Application Priority Data

Sep. 15, 2005 (CN) .......................... 2005 1 0103020

(51) Int. Cl.
*H04W 68/00* (2009.01)
(52) U.S. Cl. .................. 455/458; 455/426.1; 455/552.1; 370/320; 370/331
(58) Field of Classification Search .................. 455/522, 455/458, 426.1; 370/320, 331
See application file for complete search history.

(56) References Cited

U.S. PATENT DOCUMENTS

| | | | |
|---|---|---|---|
| 6,961,329 B1 * | 11/2005 | Bender et al. .................. 370/342 |
| 2004/0209614 A1 * | 10/2004 | Bright et al. ............... 455/426.1 |
| 2005/0276273 A1 * | 12/2005 | Oprescu-Surcobe et al. 370/401 |
| 2006/0003772 A1 * | 1/2006 | Semper ....................... 455/452.1 |
| 2006/0182069 A1 * | 8/2006 | Yu ................................ 370/335 |
| 2006/0251058 A1 * | 11/2006 | Xu et al. ....................... 370/352 |

(Continued)

FOREIGN PATENT DOCUMENTS

CN 1805603 A * 7/2006

OTHER PUBLICATIONS

3GPP2 A.S0008-0 v3.0 (TIA-878-1), May 2003.*

(Continued)

*Primary Examiner* — Wayne Cai
*Assistant Examiner* — Justin Lee
(74) *Attorney, Agent, or Firm* — Roylance, Abrams, Berdo & Goodman, L.L.P.

(57) ABSTRACT

A method for a dual-mode terminal in a HRPD network to respond to 1x paging, the method comprising steps of: after a MS/AT turns to the HRPD network and informs a MSC of the related information via PCF, the MSC sends a 1x service arrive notification message to the MS/AT via PCF including a calling party number if some 1x paging information arrives; after receiving the 1x paging, the MS/AT displays the calling party number to a user and waits for the choice of the user; the MS/AT terminates service in the HRPD network and switches into a 1x network to send a "Page Response" message to the 1x BS if the user chooses to accept the 1x call; if the user rejects to accept the 1x call, the MS/AT sends a user response rejection message to an AN, the AN forwards it to the PCF to indicate that the user can not accept this 1x call; after receiving the user response rejection message, the PCF constructs a "Paging Response" message and sends it to the MSC to inform the MSC to terminate this call; and after receiving the rejection message from the PCF, the MSC terminates this call and releases relevant resources. With the present invention, both network resources and the air link resources are saved, and any unpleasant feeling is avoided to users.

9 Claims, 4 Drawing Sheets

U.S. PATENT DOCUMENTS

| | | | |
|---|---|---|---|
| 2007/0047562 A1* | 3/2007 | Sayeedi et al. | 370/401 |
| 2007/0183351 A1* | 8/2007 | Sayeedi et al. | 370/310 |
| 2008/0248817 A1* | 10/2008 | Gao et al. | 455/458 |
| 2009/0181675 A1* | 7/2009 | Sinnarajah et al. | 455/436 |
| 2009/0323623 A1* | 12/2009 | Julka et al. | 370/329 |

OTHER PUBLICATIONS

3GPP2 A.S0009-A v1.0, Mar. 2006.*
CN1805603A English Translation.*
3GPP2 A.S0007-0. V2.0, Nov. 2001.*

* cited by examiner

METHOD FOR DUAL-MODE ACCESS TERMINAL TO RESPOND TO 1X PAGING IN HRPD NETWORK

CROSS-REFERENCE TO RELATED APPLICATION

This application claims the benefit under 35 U.S.C. §119(a) of Chinese Patent Application No. 200510103020.2, filed in Chinese Patent Trademark Office on Sep. 15, 2005, the entire disclosure of which is hereby incorporated by reference.

BACKGROUND OF THE INVENTION

1. Field of the Invention

The present invention relates to a method for responding to a received 1x paging in a dual-mode access terminal (hereinafter referred to as MS/AT) of Code Division Multiple Access 2000 1x (hereinafter referred to as CDMA2000 1x) and High Rate Packet Data (hereinafter referred to as HRPD) in a high rate packet data network.

2. Description of the Related Art

In practice, most HRPD networks are brought into service in cooperation with CDMA2000 1x network, and a user accesses the network with a dual-mode terminal. However, the cdma2000 1x network is logically independent with an HRPD network, and no information interoperation is supported in the network side of the two networks. With the development of technology, a link can be established between the two networks so that the information on call control and mobility management can be transferred between the two networks. For instance, in the case that the 3GPP2 A.S0007-A based network structure is adopted in the HRPD network, i.e., the function of Session Control/Mobility Management (hereinafter referred to as SC/MM function) is performed in PCF, the dedicated interface A1p is established between the Mobile Switch Center (hereinafter referred to as MSC) of the CDMA2000 1x network and the Packet Control Function (hereinafter referred to as PCF) of the HRPD network to bear the information on call control and mobility management between the MSC and the access node (AN). The reference model of HRPD interoperation structure with well established A1p interface is shown in FIG. 3. In 3GPP2, the network structure will be defined in specification A.S0009, which is the upgrade version of specification A.S0007-A. In this case, a dedicated logic interoperation module, which is adopted to perform the switching between the message in the A1p interface and the 3G1x service message in the air-interface, should be provided in the PCF. This scheme is called cross-paging in 3GPP2. With cross-paging, when a user moves in an HRPD network and informs MSC of the paging message via A1p interface, the MSC transmits this message in virtue of the cross-paging mechanism if some 1x paging message reaches the MSC. FIG. 4 is referred.

In the paging request message from the MSC to the PCF, no calling party number is included. Therefore, no calling party number is displayed on the terminal to user in the HRPD network even though it receives a 1x paging. Only when the MS/AT interrupts the current HRPD service and turns to the 1x network to continue the subsequent calling flow, a user may find the calling party number. The problem can be resolved by modifying the A1p message or the message flow. For instance, the Paging Request message can be extended by adding a dedicated field to bear the calling party number. In addition, some other messages may be adopted to bear the calling party number. In the subsequent description of the present application, the approach of extending the paging request message by adding a dedicated field to bear the calling party number is taken as an example.

When a 1x message bearing the calling party number is transferred to a MS/AT in an HRPD network, the user can determine whether to accept this call or not. If the user wants to accept this call, the MS/AT will switch to the 1x network and continue the subsequent operations. If the user refuses to accept this 1x call but the MS/AT does not report this refusal information to the network, the MSC will re-transmit the paging message over a wider area some time later. With nonsense, this re-transmitted paging message will cause following problems:

1. Waste of 1x network resources;
2. Waste of the HRPD network resources or air-interface resources; and
3. The user will receive the refused call repeatedly, which make him or her bored.

SUMMARY OF THE INVENTION

Therefore, an object of the present invention is to provide a method for a dual-mode terminal to respond to a 1x paging in a HRPD network. With this method, after a user accepts the 1x call, a MS/AT turns to a 1x network to continue subsequent operations; and after the user operates to refuse the 1x call, the MS/AT transfers the user's refusal information by a specific message to a MSC via a A1p interface so as to avoid unnecessary subsequent operation of the MSC.

To achieve the object mentioned above, there is proposed method for a dual-mode terminal in a HRPD network to respond to 1x paging, the method comprising steps of:

a) after a MS/AT turns to the HRPD network and informs a MSC of the related information via PCF, the MSC sends a message to the MS/AT via PCF to indicate 1x service arrival if a 1x service arrives, the message including a calling party information;

b) after receiving the 1x paging, the MS/AT displays the calling party information to a user and waits for the choice of the user;

c) the MS/AT terminates service in the HRPD network and switches into a 1x network to send a Page Response Message to the 1x BS if the user chooses to accept the 1x call;

d) if the user refuses to accept the 1x call, the MS/AT sends a response message indicates user's refusal to an AN, the AN forwards it to the PCF to indicate that the user can not accept this 1x call;

e) after receiving the message indicates user's refusal, the PCF constructs a response message to the paging and sends it to the MSC to inform the MSC to terminate this call; and f) after receiving the rejection message from the PCF, the MSC terminates this call and releases relevant resources.

With the present invention, both network resources and the air link resources are saved, and any unpleasant feeling is avoided to users.

DETAILED DESCRIPTION OF EXEMPLARY EMBODIMENTS

Figure 1:
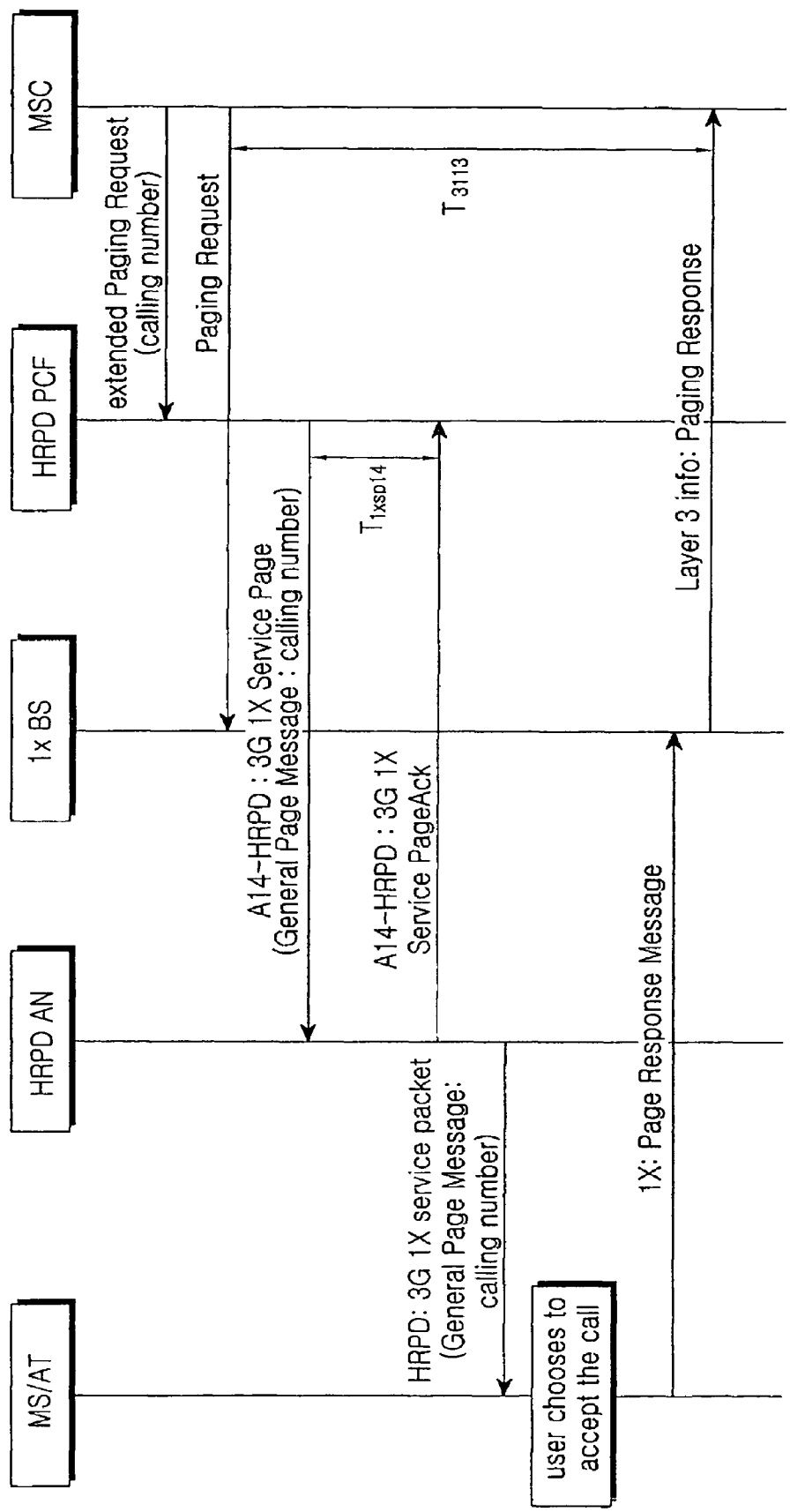
FIG. 1 illustrates an operation flow that a user chooses to accept a 1x call.

In the present invention, two processes are operated when the MS/AT receives 1x call in the HRPD network, i.e., the user chooses to accept a 1x call and the user chooses not to accept a 1x call. These two cases are described in subsequent section 1 and section 2 respectively.

1. The Case that User Chooses to Accept a 1x Call

It includes following steps:

1) When the MSC receives a call terminated a MS/AT within its service region, it sends a calling party information included message to the HRPD PCF to indicate the arrival of call. If the message is a Paging Request one, it can be extended to include information such as the calling party number, the calling name and so on. In the meantime, the MSC sends a "Paging Request" message to one or more of service 1x BSs reachable by the called MS/AT. This "Paging Request" message may contain Virtual Paging Indicator (hereinafter referred to as VPI) to inform the 1x BS not to send a "General Page Message" to the called MS/AT via the air-interface. Meanwhile, a clock T3113, which will stop when the MSC receives the Paging Response message, starts for this Paging Request message.

2) The HRPD PCF sends an "A14-1x Service Page" message to the HRPD AN, including the "General Page" message that will be transmitted via the air-interface. At the same time, a clock T1xsp14, which will stop when the HRPD PCF receives the A14-HRPD 3G 1x Service Page Ack message, starts.

3) The HRPD AN sends an A14-1x Service Page Ack message to the HRPD PCF and the HRPD PCF stops the clock $T_{1xsp14}$.

4) HRPD AN transfers a 3G1x service packet to the MS/AT, indicating the 1x service arrive message, which includes the calling party information.

5) The user chooses to accept the 1x call.

6) The MS/AT turns to the 1x system and sends the Page Response Message as the acknowledgement to the HRPD AN via the 1x's access channel.

7) The 1x BS constructs a Paging Response message and sends it to the MSC by including it in the complete layer 3 information message. The MSC stops the clock $T_{3113}$ and the subsequent flow completes according to 3GPP2 related criteria. For the convenience of user's operation, in subsequent steps, the click on key "ACK" step can be omitted and replaced by terminal's auto-operation.

The operation flow that user chooses to accept 1x call is illustrated in FIG. 1.

2. The Case that User Chooses not to Accept 1x Call

It includes following steps:

Steps 1) through 4) are the same as those in the case that user chooses to accept 1x call.

5) User chooses not to accept 1x call.

6) The called MS/AT sends the response message to HRPD AN, indicating that user chooses not to accept 1x call.

7) The HRPD AN constructs a 3G1x message to indicate user's rejection, and sends it to the HRPD PCF by including it into A14-HRPD packet.

8) The HRPD PCF constructs a Rejection message and sends it to the MSC to inform the MSC to terminate this call. After the MSC receives this message, it stops the clock $T_{3113}$ and the subsequent call flow is performed according to 3GPP2 relevant specifications.

In the above step 6), it is necessary for the called MS/AT to send the response message to the HRPD AN to indicate the user's refusal. In this response message, the user refusal information can be indicated by the extended new field in the Page Response Message, which is included in the 3G1x service packet and sent to AN. Also, the user' refusal information can be indicated by the reserved field in the 3G1x packet ACK message. In the reserved field, a specific value is defined to indicate that the user chooses not to accept the call. In addition, the 3G1x terminal (mobile station) reject order can be used to indicate the user's rejection information. After receiving the 3G1x packet ACK message with specific value sent from the MS/AT and forwarded by the AN, the PCF can be sure that this call has been rejected by the user.

In the above step 8), a new field indicating the user's refusal can be added in the paging Response message and the PCF informs the MSC to terminate the call in virtue of this extended paging Response message. Also the process that the PCF informs the MSC to terminate the call can be implemented by setting the radio environment and resource option as "not available" in the Paging Response message. The PCF can also send a Rejection message to the MSC to denote the call's state.

Figure 2:
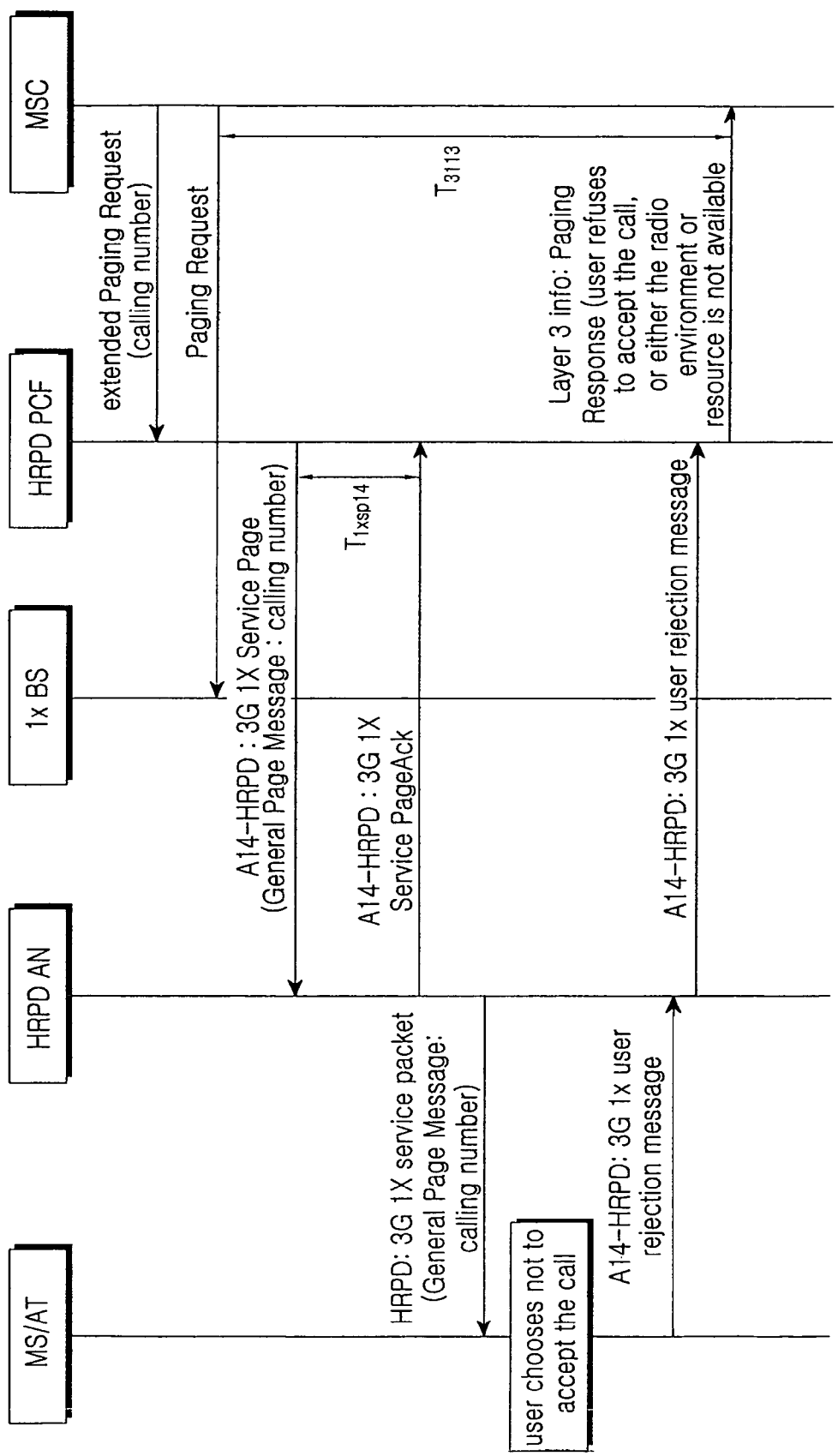
FIG. 2 illustrates an operation flow that a user chooses not to accept a 1x call.
Figure 3:
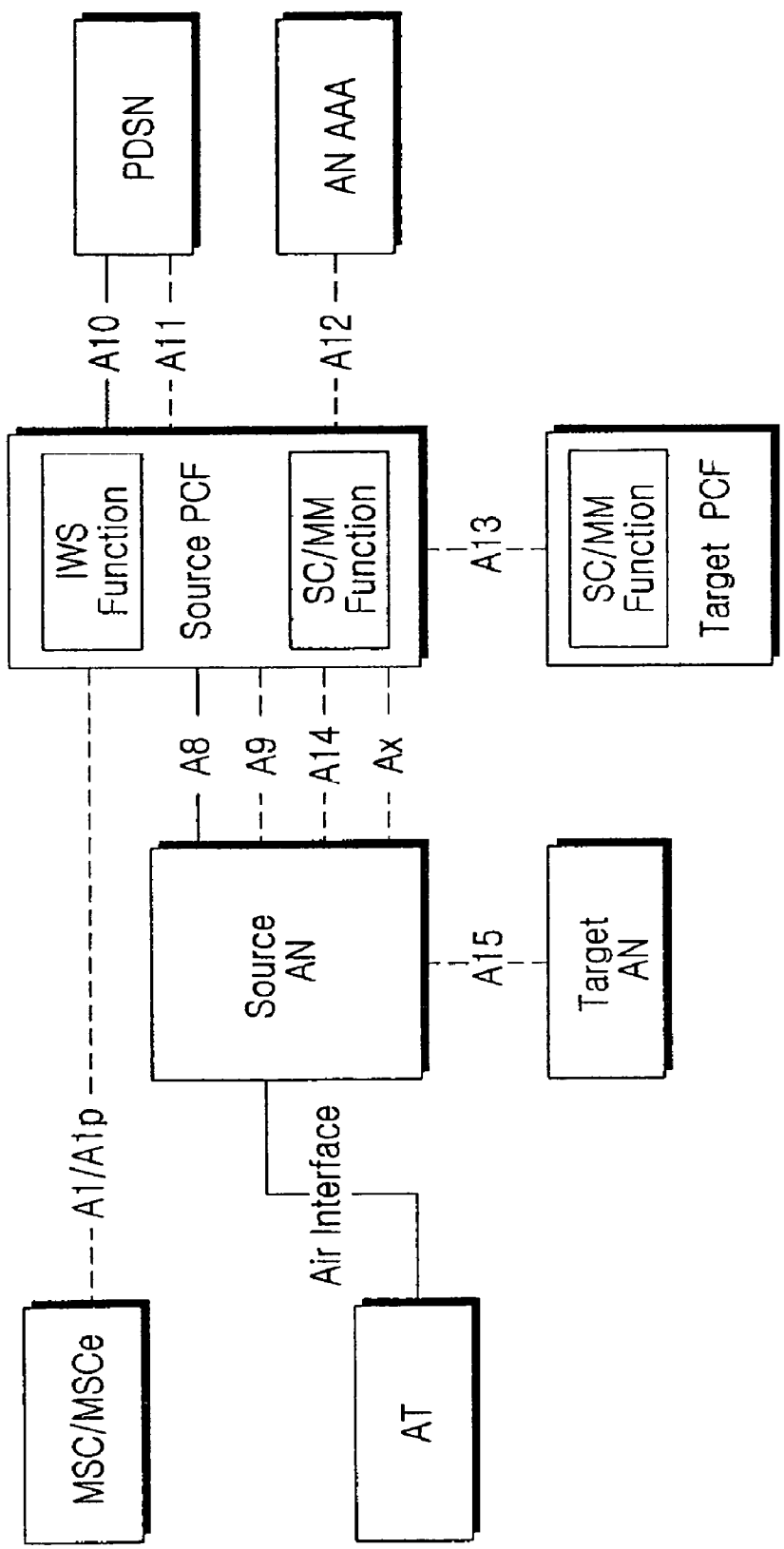
FIG. 3 shows a reference model (the SC/MM function is performed in PCF) of a HRPD interoperation structure in the case that an A1p interface is well established.
Figure 4:
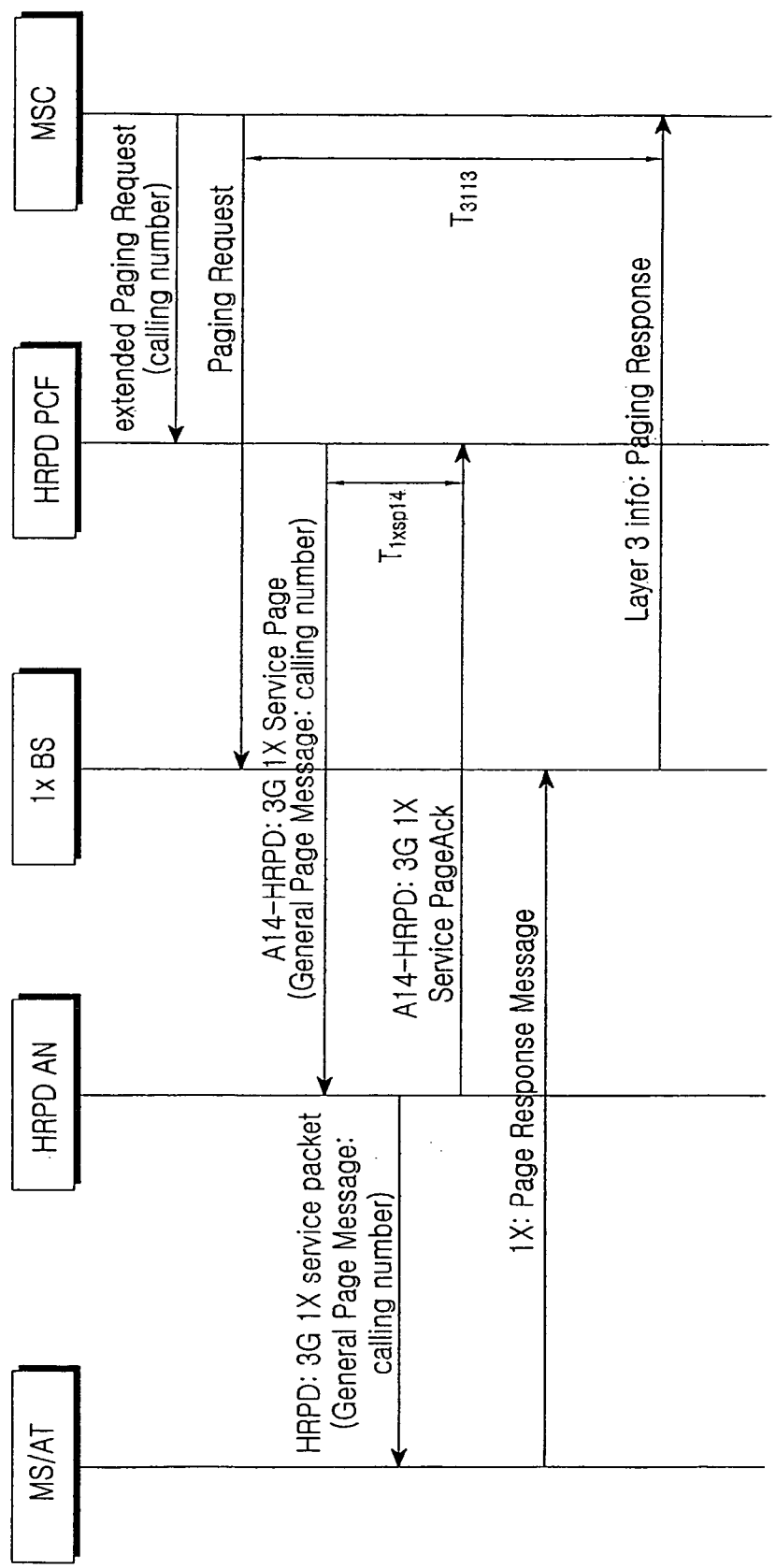
FIG. 4 illustrates an available operation flow that an MS/AT receives 1x paging in a HRPD network.

An operation flow that a user chooses not to accept the 1x call is illustrated in FIG. 2.

3. Regarding the User's Choices

Two kinds of choices are offered for a user. One is that a user makes a choice each time. When the MS/AT in the HRPD network receives the 1x call, it should remind the user to make a choice and display the calling party number. The user can make a choice through the man-machine interface. If the user chooses not to accept the call, the prompt signal disappears but no interruption is caused to the HRPD service. The other is to preset in advance. The user can set the MS/AT to reject or accept 1x call in advance. The settings can be done for all calls or some specific number. When a 1x call arrives, the MS/AT operates according to the preset settings.

What is claimed is:

1. A method for a dual-mode Mobile Station/Access Terminal (MS/AT) in a High Rate Packet Data (HRPD) network to respond to a Code Division Multiple Access (CDMA) 1x ("1x") paging, the method comprising steps of:

a) sending a message by a Mobile Switching Center (MSC) of a 1x network via a Packet Control Function (PCF) of a HRPD network to the MS/AT to indicate an arrival of a 1x service call;

b) after receiving the message indicating the 1x call, displaying calling party information of the 1x call by the MS/AT to a user and waiting for a choice of the user;

c) turning to the 1x network by the MS/AT to send a Page Response Message to a 1x base station (BS) of the 1x network if the user chooses to accept the 1x call;

d) if the user chooses not to accept the 1x call, sending a message by the MS/AT to indicate user's refusal to an access network (AN) of the HRPD network, and transferring the message by the AN to the PCF;

e) after receiving the message to indicate user's refusal, the HRPD PCF constructing a corresponding Rejection message and sending it to the MSC to inform the MSC to terminate this call; and f) after receiving the Rejection message from the HRPD PCF, the MSC terminating this call and releasing relevant resources;

wherein when waiting for the choice of a user, the MS/AT does not turn to the 1x network, and if the MS/AT is in a state of an HRPD connection, no interrupt is caused to the HRPD connection when displaying the calling party number or waiting for the choice of the user.

2. The method according to claim 1, wherein the message sent by the MSC to indicate the arrival of the 1x call includes calling party information.

3. The method according to claim 1, wherein the choice of the user can be from the user's operation each time through a man-machine interface.

4. The method according to claim 1, wherein choice of the user can be from the preset settings by the user for all 1x calls or some specific calling party numbers, and the MS/AT operates automatically according to the preset settings.

5. The method according to claim 1, wherein if the user chooses to accept the 1x call, the MS/AT automatically turns to the 1x network.

6. The method according to claim 1, wherein when the user refuses to accept the call, a 3G1x MS rejection order is used for the response message sent from the called MS/AT to the HRPD AN to indicate the user's refusal.

7. The method according to claim 1, wherein after receiving the message to indicate user's refusal forwarded by the AN, the HRPD PCF informs the MSC to terminate this call by adding a new field in the Paging Response message indicating the user's refusal.

8. The method according to claim 1, wherein after receiving the message to indicate user's refusal forwarded by the AN, the HRPD PCF informs the MSC to terminate the call by setting the radio environment and resource option as "not available" in the Paging Response message.

9. The method according to claim 1, wherein after receiving the message to indicate user's refusal forwarded by the AN, the HRPD PCF informs the MSC to terminate the call in virtue of a Rejection message.

\* \* \* \* \*